United States Patent Office 3,107,757
Patented Oct. 22, 1963

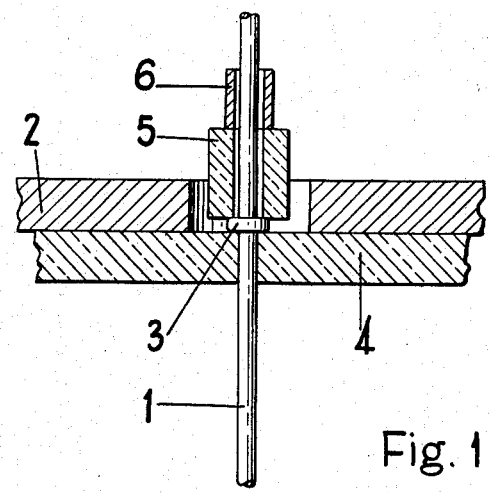
Fig. 1
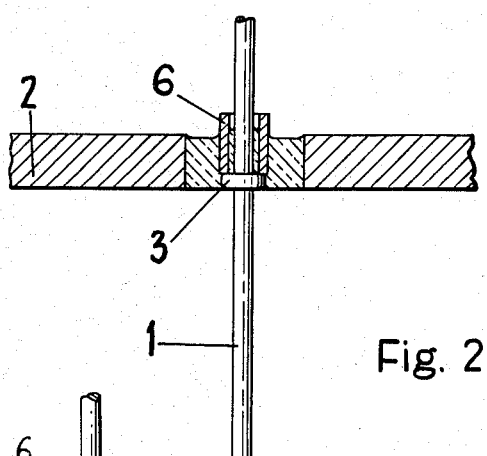
Fig. 3    Fig. 2
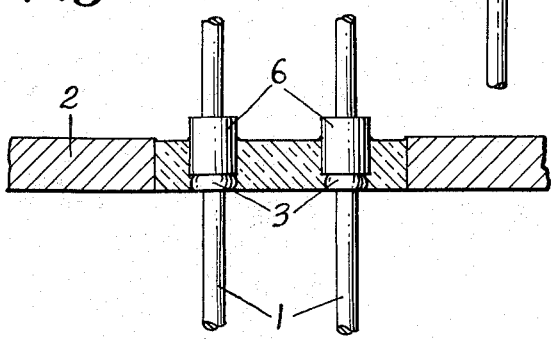

3,107,757
GLASS-TO-METAL SEALS
Robert Leonard Breadner, Harrow, England, assignor to The General Electric Company Limited, London, England
Filed Oct. 30, 1959, Ser. No. 849,927
Claims priority, application Great Britain Nov. 5, 1958
1 Claim. (Cl. 189—36.5)

This invention relates to a seal of a metal wire, or wire-like electrical conductor, hereinafter referred to, simply as "wire," through a glass body.

In sealing a wire through a glass body it is necessary that the co-efficients of expansion of the glass and of the metal of the wire should be suitably matched, and that the glass should wet the surface of the wire readily. A consequence of the ready wetting of the wire by the glass is that the glass tends to creep along the surface of the wire, forming a meniscus which, after solidification, is very fragile at its sharp edge. During subsequent handling of the seals cracks are liable to start at this sharp edge on flexure of the wire or on exposure to thermal shock, and may then spread throughout the glass body, leading to failure of the seal.

Methods of reducing this difficulty have been proposed in which a flange formed on or carried by the wire abuts against or is embedded in the glass surface and an object of the present invention is to provide a further seal which may be used as an alternative to, or in some cases in conjunction with, these previously proposed seals.

A matched glass-to-metal seal according to the present invention comprises a glass body, a metal wire hermetically sealed through the glass body, and a single metal sleeve closely surrounding the wire and extending through one surface of, and the greater part of the way through, the glass body, and sealed to the glass on both the inner and outer surfaces of the sleeve.

By "closely surrounding" is meant so spaced from the wire that the thickness of the cylindrical annulus of glass between the wire and sleeve is small in comparison with the depth of penetration of the sleeve into the glass. Preferably also the thickness is also small compared with the minimum width of the region of the glass lying outside the sleeve.

Preferably also the sleeve projects some way out of the glass so as to limit the extent to which the wire at or very close to the glass surface at that side can be bent.

The metal components must, of course, be suitably matched to the glass as regards their thermal expansion coefficients, the closeness of the matching required depending, of course, on the ductility of the metal, on the dimensions of the parts of the seal, and on the type of seal, as is well known.

The seal will, in general, be completed by sealing the glass body in turn, or simultaneously, into an aperture in a further body, which may be of metal, ceramic or glass, whose thermal expansion coefficient must also be suitably matched to that of the glass.

With a seal constructed in accordance with the invention, the outward spreading through the glass of any small crack started by bending of the wire at a side of the glass through which the sleeve passes, or by thermal shock, is stopped by the sleeve, and as such cracks do not spread very readily downwards through the thin and relatively deep glass annulus between the sleeve and wire, the possibility of such a crack leading to failure of the seal is greatly reduced.

Preferably in a seal according to the present invention the metal wire is provided with a flange embedded at the other surface of the glass body and the embedded end of the sleeve abuts the flange.

Such seals are particularly convenient for manufacture by methods in which the components are assembled in position in a jig before fusion of the glass, since the flange may be employed to locate the wire in the jig and also as a stop to locate the sleeve on the wire.

In a preferred method of manufacturing a seal according to the present invention, the metal components and the required amount of glass are assembled in a jig having one end closed by a carbon surface shaped to correspond to the desired form of one end of the glass body, the wire or wires being fitted into one or more locating holes provided in the carbon, the jig is placed within a centrifuge in a furnace with the wires lying radially with respect to the axis of rotation of the centrifuge and with the carbon-closed end outwards, and the centrifuge is heated either directly or indirectly within the furnace to the appropriate glass-melting temperature whilst the centrifuge is rotated at a speed sufficient for the centrifugal force generated to press the molten glass into good sealing contact with the metal components. A method of this kind is described and claimed in copending U.S. patent application Serial No. 788,096, now Patent No. 2,992,-513. Preferably in use of this method the wire is provided with a flange as described above, which flange rests on the carbon surface and locates the wire at the required depth in the jig, the sleeve then being assembled on the wire to rest on a glass pellet which itself rests on the flange, and the length of the sleeve and the amount of glass being chosen so that the sleeve is embedded in glass to the desired depth in the completed seal. When the seals are small a large number may be formed in a single step in a centrifuge of moderate size by this method.

Multiple seals may be formed in which two or more wires are sealed through the glass body, some or all of the wires being provided with sleeves according to the present invention. Similarly multiple seals may be formed in which a single plate, for example of metal, is provided with two or more apertures in each of which is sealed a glass body through which is sealed one or more metal wires each surrounded by a sleeve according to the invention.

Preferably in the manufacture of any such multiple seal the components of all seals are assembled and the sealing carried out in a single heating step in a centrifuge as described above.

In a device having a hermetically sealed envelope through which insulated electrical conductors are required to pass, for example a thermionic valve or a semiconductor device, the conductors may be sealed through the envelope by one or more seals according to any of the above aspects of the invention.

An embodiment of the invention will now be described with reference to the accompanying drawing in which FIGURE 1 is a part section through the assembled components of a seal during the process of manufacture;

FIGURE 2 is a similar part section through a completed seal; and

FIGURE 3 is a part section similar to FIG. 2 through a completed seal embodying a modified form of the invention in which two wires are sealed through the same glass portion.

Referring first to FIGURE 1, a wire 1 is to be sealed through an aperture in a plate 2 by an insulating seal of matched glass. For example the wire and the plate may be of copper and the glass may be copper sealing glass according to U.S. Patent No. 2,929,727. The wire 1 is formed with a flange 3, either by upsetting or by any other suitable means, for example by the use of a deformed washer according to the method described in British patent specification No. 629,742. The wire 1 and the plate 2 are assembled in a jig in which they rest on a graphite plate 4 having a hole through which the wire 1 passes until the flange 3 rests on the surface of the plate. A tubular pellet 5 of sintered powdered sealing glass is placed round the wire 1 and rests on the flange 3, and a sleeve 6, of the same metal as the wire, and of such a size as to slide loosely over it, is slid over the wire to rest on the glass pellet 5. The assembly is then placed in a centrifugal sealing apparatus with the wire 1 arranged radially and with the graphite plate 4 outwards, and is heated to the glass melting temperature while being rotated so as to generate a centrifugal force which presses the glass outwards to form the seal as described in said copending U.S. patent application No. 788,096, the completed seal being as shown in FIGURE 2.

In one example of a seal according to the invention made by the above method, the plate 2 was of copper, 1/8" thick, intended for attachment to the remaining part of the metal envelope of a semiconductor device, the wire 1 was of copper, 0.032 of an inch thick, and was upset to form a flange 0.060 of an inch in diameter, and the sleeve 6 was also of copper, of dimensions 1.067 inches outside diameter, 0.043 inch inside diameter, and 0.105 inch long. All the copper components were lightly oxidised and coated with borax in the usual way before assembly.

FIG. 3 shows a double seal, i.e. one in which two wires rather than one are sealed through a single aperture in a plate by an insulating seal of matched glass. The seal is otherwise identical in structure and method of manufacture to that shown in FIG. 2 and corresponding elements are correspondingly numbered. Thus, each of the wires 1 is formed with a flange 3 as before and the wires, the plate 2 and the sleeve 6, together with pellets of sintered powdered sealing glass are assembled exactly as before in a jig in which they rest on a graphite plate having holes through which the wires 1 pass until their flanges 3 rest on the surface of the plate. The assembly is then sealed in a centrifugal sealing apparatus as described above with reference to FIGS. 1 and 2.

I claim:

A matched glass-to-metal seal comprising a metal wire hermetically sealed through the glass body, and a single metal sleeve closely surrounding the wire and extending through one surface of, and the greater part of the way through, the glass body, and sealed to the glass body on both the inner and outer surfaces of the sleeve, said metal wire having a flange embedded in the other surface of the glass body, the embedded end of the sleeve abutting said flange.

References Cited in the file of this patent

UNITED STATES PATENTS

| | | |
|---|---|---|
| Re. 22,851 | Spencer | Mar. 11, 1947 |
| 2,483,940 | Scott | Oct. 4, 1949 |
| 2,709,872 | Slomski | June 7, 1955 |
| 2,784,532 | Griffiths | Mar. 12, 1957 |
| 2,859,562 | Dorgelo et al. | Nov. 11, 1958 |
| 2,912,794 | Harvey | Nov. 17, 1959 |
| 2,933,552 | Schurecht | Apr. 19, 1960 |